(12) United States Patent
Serebrin et al.

(10) Patent No.: US 10,133,497 B1
(45) Date of Patent: Nov. 20, 2018

(54) SPI COMMAND CENSORING METHOD AND APPARATUS

(71) Applicant: GOOGLE INC., Mountain View, CA (US)

(72) Inventors: Benjamin Charles Serebrin, Mountain View, CA (US); Timothy Chen, Mountain View, CA (US); Scott Johnson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 301 days.

(21) Appl. No.: 15/247,199

(22) Filed: Aug. 25, 2016

Related U.S. Application Data

(60) Provisional application No. 62/210,812, filed on Aug. 27, 2015.

(51) Int. Cl.
*G06F 3/06* (2006.01)
*G06F 21/52* (2013.01)

(52) U.S. Cl.
CPC .......... *G06F 3/0622* (2013.01); *G06F 3/0659* (2013.01); *G06F 3/0679* (2013.01); *G06F 21/52* (2013.01); *G06F 2221/034* (2013.01)

(58) Field of Classification Search
CPC ...... G06F 3/0622; G06F 21/52; G06F 3/0659; G06F 3/0679; G06F 2221/034
See application file for complete search history.

(56) References Cited

U.S. PATENT DOCUMENTS

| | | | |
|---|---|---|---|
| 4,309,755 A | 1/1982 | Lanty | |
| 2012/0255010 A1* | 10/2012 | Sallam | G06F 21/572 726/24 |
| 2018/0225230 A1* | 8/2018 | Litichever | G06F 21/56 |

FOREIGN PATENT DOCUMENTS

WO    WO-2017046789 A1 *   3/2017   ............ G06F 21/50

OTHER PUBLICATIONS

Vaid, "Microsoft's Project Olympus delivers cloud hardware innovation at scale", https://azure.microsoft.com/en-us/blog/microsofts-project-olympus-delivers-cloud-hardware-innovation-at-scale/, Nov. 8, 2017, 6 pages.
U.S. Appl. No. 15/247,626, filed Aug. 25, 2016.
U.S. Appl. No. 15/247,632, filed Aug. 25, 2016.
"Notice of Allowance", U.S. Appl. No. 15/247,626, dated Sep. 14, 2018, 7 pages.

* cited by examiner

*Primary Examiner* — Michael Alsip
(74) *Attorney, Agent, or Firm* — Colby Nipper

(57) ABSTRACT

A method in a memory system having a security device and a serial external electrically erasable read-only memory (EEPROM) is disclosed. The method includes accepting N bits of a command prefix and matching the bits to command filtering rules. Upon matching the prefix to a command filtering rule, the method may perform a filter action associated with the matched rule. When the command prefix is for a destructive command prefix that can modify data in the EEPROM, the filter action may convert the command into a non-destructive command and inspect it for authentication. The converted command may be output to the external EEPROM without security processing in the security device and the external EEPROM may return read data without outputting. When the command prefix is for a non-destructive command prefix, the command may be allowed to pass through the external EEPROM unchanged without performing security processing in the security device.

20 Claims, 11 Drawing Sheets

FIG. 3

Allowed SPI Commands (Single Mode): ["Read", 0x3],

["High-Speed Read", 0x0B], ["Read Burst", 0x0C],
["Read PI", 0x8],

["Read I", 0x9],

["Read BI", 0x10],

Allowed SPI Commands (Dual Mode):

["Fast read dual I/O", 0xBB], ["Fast read dual Output", 0x3B]

FIG. 5

| Command Bits (MSB->LSB) | Filter Function | Filter Action |
|---|---|---|
| 1XXX_XXXX | FORCE | 0x03/0xBB |
| 01XX_XXXX | FORCE | 0x03 |
| 001X_XXXX | FORCE | 0x03/0x3B |
| 0001_XXXX | FORCE | 0x10 |
| 0000_0XXX | FORCE | 0x03 |
| 0000_11XX | FORCE | 0x0C |
| 0000_101X | FORCE | 0x0B |
| 0000_100X | ALLOW | Not Applicable |

FIG. 7

| Time | Firmware | Controller | External Master |
|---|---|---|---|
| 0 | idle | idle | page--programming command |
| 1 | interrupted | BUSY=1 | poll for BUSY=0 |
| 2 | validates write data | BUSY=1 | poll for BUSY=0 |
| 3 | validates write data | BUSY=1 | poll for BUSY=0 |
| 4 | writes to external slave | BUSY=1 | poll for BUSY=0 |
| 5 | polls for external slave busy | BUSY=1 | poll for BUSY=0 |
| 6 | clears BUSY | BUSY=0 | poll for BUSY=0 |
| 7 | idle | pass through command to slave | normal read command |

FIG. 8

801  803  805 singleRules = [
["1",       FORCE, "00000011"],
["01",      FORCE, "00000011"],
["001",     FORCE, "00000011"],
["0001",    FORCE, "00010000"],
["000011",  FORCE, "00001100"],
["0000101", FORCE, "00001011"],
["0000100", ALLOW_LAST_BITS],
["00000",   FORCE, "00000011"]
]

dualRules = [
["1",       FORCE, "10111011"],
["01",      FORCE, "00000011"],
["001",     FORCE, "00111011"],
["0001",    FORCE, "00010000"],
["000011",  FORCE, "00001100"],
["0000101", FORCE, "00001011"],
["0000100", ALLOW_LAST_BITS],
["00000",   FORCE, "00000011"]
]

SPI COMMAND CENSORING METHOD AND APPARATUS

This Nonprovisional application claims priority under 35 U.S.C. § 119(e) on U.S. Provisional Application No. 62/210, 812 filed on Aug. 27, 2015, the entire contents of which are hereby incorporated by reference.

This application is related to application, U.S. Provisional Application No. 62/210,789, and to application, U.S. Provisional Application No. 62/210,828, which are hereby incorporated by reference.

BACKGROUND

Field

The present disclosure relates to an apparatus and method for filtering Electrically Erasable Programmable Read Only Memory (EEPROM) Serial Peripheral Interface (SPI) commands for performing operations in an external EEPROM. Aspects allow a secure SPI device to include large off-chip storage. The secure SPI device may be a drop-in replacement for a standard SPI EEPROM in which an SPI master chip is unaware of the added security features.

SUMMARY

Embodiments disclosed here may pertain to a method in a memory system having a security device and a serial external electrically erasable read only memory (EEPROM), including: accepting N bits of a command prefix and matching the N bits to command filtering rules; upon matching the command prefix to a rule of the command filtering rules, performing a filter action associated with the matched rule; when the command prefix that matches to the rule is for a destructive command prefix, where a destructive command is one that can modify data in the EEPROM: the filter action converts the command into a non-destructive command; the destructive command is inspected for authentication; the converted command is output to the external EEPROM without security processing in the security device, and the external EEPROM returns read data without outputting; when the command prefix that matches to a rule is for a non-destructive command prefix, the command is allowed to pass through to the external EEPROM unchanged without performing security processing in the security device.

According to an aspect, when the rule includes a command prefix pattern, a filter function, and a filter action, when the command prefix matches to the command prefix pattern, the filter function included in the rule containing the command prefix pattern is performed.

According to another aspect, when the command prefix matches a rule for a destructive command, the destructive command is authenticated by the security device in parallel with the step of converting the command. Moreover, the non-destructive command may be a Read-like command for returning predefined dummy data.

Another embodiment includes a memory system, including: a serial electrically erasable read only memory (EEPROM); a security device connected to a command input pin of the EEPROM, the security device captures commands being sent to the EEPROM and performs security processing on said captured commands that are destructive commands while converting the destructive commands into non-destructive commands to be transmitted to the EEPROM, and allows non-destructive commands to pass through unmodified to the EEPROM, the destructive commands being commands that modify data in the EEPROM.

An aspect of the memory system embodiment is a master device that manages the destructive and the non-destructive commands, wherein the EEPROM returns data based on the destructive and non-destructive commands. Moreover, in other aspects, the security device may include a programmable rule storage device storing a programmable rule set, each programmable rule including a command prefix and associated conversion action, wherein the security device detects whether a command transmitted from the master device is a destructive command or a non-destructive command by matching the transmitted command to the command prefix in a rule, and determines a conversion action when the matched command prefix is for a destructive command.

In another aspect of the memory system embodiment the programmable rule storage device may include a plurality of registers for each respective rule, in which each rule delineates the conversion action based on a matched command prefix.

In yet another aspect of the memory system embodiment, the conversion action may modify the command into a non-destructive command, which is transmitted to the EEPROM, and the EEPROM may return a predefined data output to the security device.

In a further aspect of the memory system embodiment, the command may be serially transmitted from the master device as command bits and when there is a complete match of a command prefix to command bits, a rule action associated with the matching command prefix is performed.

In a yet further aspect of the memory system embodiment, the command bits may be received with MSB first and the security device may maintain a shift register that shifts in command bits from the LSB, wherein the matching is performed as command bits are shifted in the shift register.

These and other aspects are described with respect to the drawings. The teachings of the disclosed application can be readily understood by considering the following detailed description in conjunction with the accompanying drawings.

BRIEF DESCRIPTION OF THE DRAWINGS

FIG. 3 is a table of SPI Commands that may be allowed to pass through;
FIG. 5 is a table showing exemplary filtering rules;
FIG. 7 is a table showing arbitration of the SPI master;
FIG. 8 is a list of exemplary rules for single mode EEPROM and a list of example rules for dual mode EEPROM.

DETAILED DESCRIPTION

Figure 1:
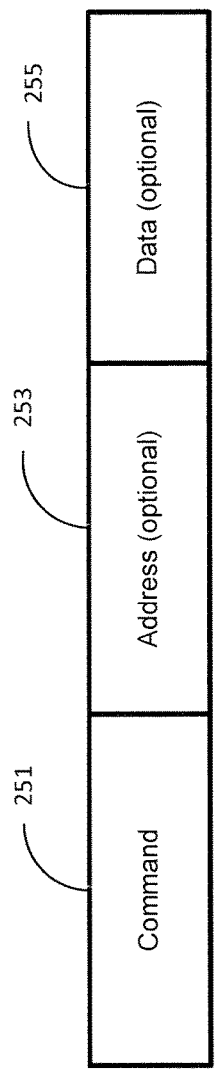
FIG. 1 is a table showing an SPI command format.

The following description refers to the accompanying drawings. The following description is not intended to limit the scope. Instead, the scope is defined by the appended claims.

<Acronyms>
- MISO—Master Input, Slave Output (Output from Slave).
- MOSI—Master Output, Slave Input (output from Master).
- SPI—Serial Peripheral Interface.
- EEPROM—Electronically Erasable Programmable Read-Only Memory.
- FIFO—First In First Out (TX—transmission; RX—reception).

<Secure Memory System>

EEPROM is a type of memory device that is compact and is generally faster than conventional disk drives in the case of non-volatile memory storage devices. A fast and relatively inexpensive type of EEPROM is a serial EEPROM having a serial input pin. A serial EEPROM can interface with a serial bus, such as Serial Peripheral Interface (SPI). SPI EEPROM can be of single mode or of dual mode. In the case of dual mode, two of the EEPROM's data pins can be used bi-directionally, whereas in the case of a single mode, one EEPROM pin is used for input, and the other pin is used for output. SPI devices communicate over the SPI bus using master-slave architecture. In the case of SPI EEPROM, an SPI master device communicates with one or more slave memory devices. Signals sent over the SPI bus include SCK (Serial Clock output from the SPI master device), SS (Slave Select), Master Output, Slave Input (MOSI), and Master Input, Slave Output (MISO). The Slave Select signal is used to select a slave device.

The MOSI signal typically includes a command to the slave device. The command is a bit-serial stream that includes bits representing the command, being sent most significant bit first, followed by an optional address, followed by optional write data, followed immediately by an optional read response. The format of an SPI command is shown in FIG. 3. The command format includes Command 251, Address 253 (optional), Data 255 (optional). The command 251 may be 8-bit, but may also be other sizes, such as 16-bit.

The interface for the SPI master device may be controlled by a microcontroller. The slave memory device may be an EEPROM. The EEPROM may require protection from potentially destructive commands. Potentially destructive commands may include those commands that can alter the state or data stored in the EEPROM. Various forms of write, mode-changing, and erase commands are examples of potentially destructive commands.

A security device may be added between an SPI EEPROM and its master in order to cryptographically protect the EEPROM from unauthorized writes and erases. However, adding security processing for potentially destructive commands may interfere with the SPI EEPROM protocol. The SPI EEPROM protocol does not allow a cycle delay between command and data. For example, some EEPROM commands such as Read Status Register (RDSR) and normal read commands require an immediate response to the command.

An aspect is a secure memory system that can be a drop-in replacement for a standard SPI EEPROM. The secure memory system is capable of protecting an external slave EEPROM by way of a security device that can cryptographically check EEPROM writes, erases, and rewrite processes before making them readable. The security device can perform these cryptographic operations without the SPI master chip or the EEPROM being aware of the added security features.

In some embodiments, in order to perform cryptographic operations, SPI EEPROM commands may first be uploaded to the security device by the master device microcontroller. The security device may then cryptographically check some commands and identify the allowed commands, and use the SPI master interface to reissue the allowed commands to the external EEPROM. However, such an ideal system may not be possible because some frequently used SPI EEPROM commands such as RDSR (0x05) and read (0x03) require an immediate response. If the SPI command were to be first processed by firmware and then reissued to the external EEPROM, the time delay would violate the SPI EEPROM protocol.

Thus, an aspect of the secure memory system is a capability of processing commands in a time frame of a standard SPI EEPROM. The standard SPI EEPROM protocol does not allow any wait-state cycles between the time that a command is received and data is expected. Since there are no wait-state cycles, there is limited ability to monitor and control commands. An aspect may be a security device that works with the SPI master interface to perform a command filtering operation.

<SPI Security Device as Proxy for External EEPROM>

Figure 2:
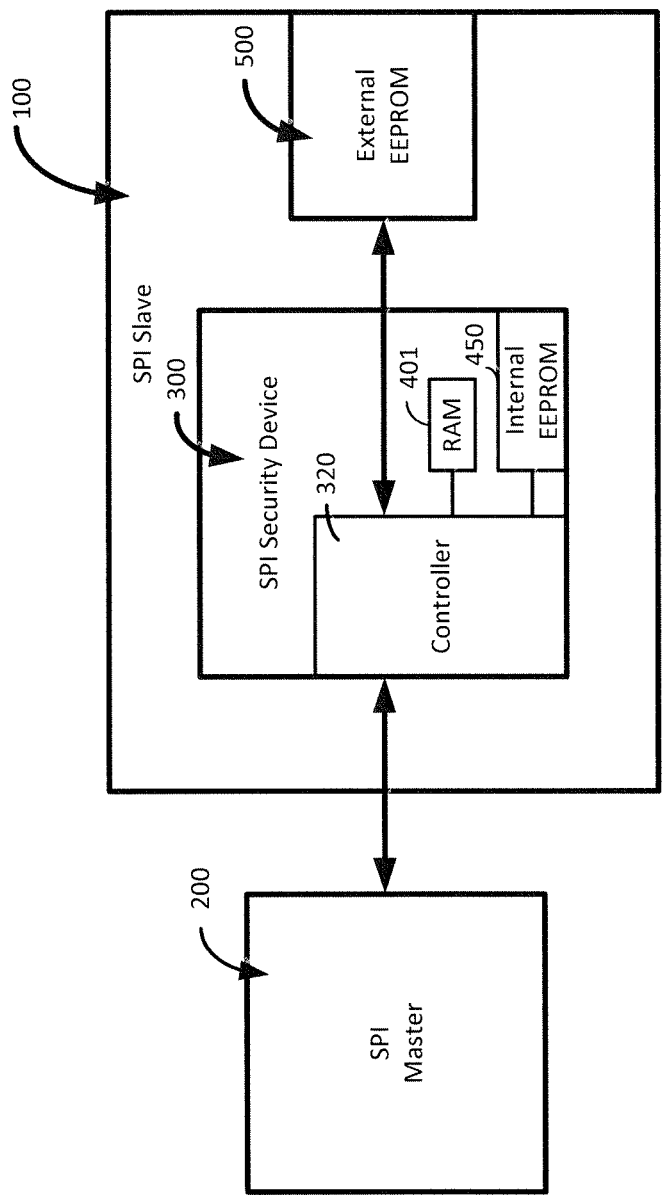
FIG. 2 is a block diagram for a SPI security device in external EEPROM mode.

FIG. 2 is a block diagram for a secure memory system that may be a replacement for an SPI EEPROM device. The secure memory system may communicate by way of an SPI bus that connects an SPI Master 200 to an SPI Slave 100. The SPI Slave 100 may include a security device 300 in addition to an on-chip Internal EEPROM 450, and an associated controller 320. The controller 320 may be a microcontroller that controls firmware. In addition, the SPI Slave 100 can be expanded to include an External EEPROM 500, as well as an on-chip RAM 401.

Provided the configuration of the secure memory system as shown in FIG. 2, SPI read commands may be processed differently, depending on which of the storage devices is being addressed. The controller 320 could activate one of the RAM 401, Internal EEPROM 450, or External EEPROM 500 depending on the address.

<SPI Command Filtering>

An aspect is to directly forward commands received on the input pin of the security device to the output pin of the security device once command filtering has been applied and has determined that the command is non-destructive. Otherwise, the command filtering operation may include conversion of commands to non-destructive read commands that read data based on a dummy address.

FIG. 3 shows examples of non-destructive SPI Commands that are allowed to pass through without being cryptographically checked in firmware. The commands differ depending on whether the EEPROM performs commands in single mode or in dual mode. As discussed above, in the case of dual mode, two of the EEPROM's data pins can be used bi-directionally, whereas in the case of a single mode, one EEPROM pin is used for input, and the other pin is used for output. An EEPROM that has been configured for dual mode uses a second pin for bidirectional signal transfer, whereas an EEPROM configured for single mode uses one pin for reception of command signals.

An aspect of command filtering is a programmable rule table that stores command prefixes, an indication of whether or not a command can be passed through (Allowed) or should be modified into a non-destructive command (Forced), and a value that serves as a modification action. An aspect is a rule storage device that stores the programmable rule table in registers, where each register stores a rule.

Figure 4:
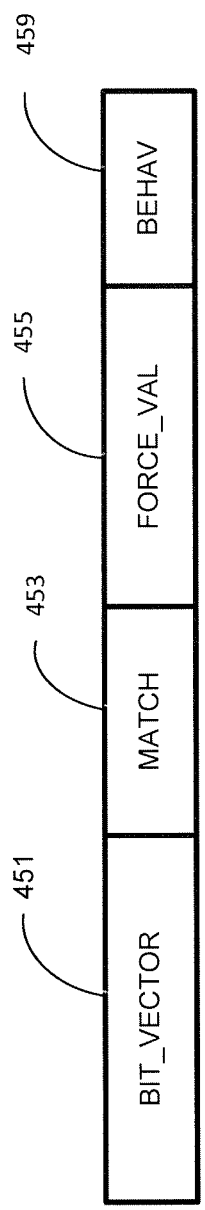
FIG. 4 is a table showing a filtering rule format.

FIG. 4 shows an example rule format in a register.

The BIT_VECTOR field 451 stores a bit vector to indicate the number of bits in an input command stream that are to be compared. Bits that are to be compared can have a value of 1 or 0. Bits that are not to be compared are considered as "don't care" bits. A purpose of this field is to help differentiate between 0's and remaining don't care bits.

The MATCH field 453 stores the matching pattern for the particular rule to be matched to the input command stream.

The BEHAV field 459 stores the filter action, represented as either a 0 or a 1, for an associated command match.

0 allows command to pass through 1 forces command to FORCE_VAL field

The FORCE_VAL field 455 stores the modification action to be applied to the input command, and can include the command that the input command is to be forced to if the value in BEHAV is 1.

An example programmable rule table is shown in FIG. 5. The command bits 653 are stored in a MATCH field 453 for each rule, and are arranged in the table from most-significant bit to least-significant bit. The Filter Function values 659 may be stored in the BEHAV field 459 for each rule. The Filter Actions 655 may be stored in the FORCE_VAL field 455 for each rule. Command bits 653, shown as "x" in FIG. 5, may constitute don't care bits. Values in Filter Actions 655 may be the commands to which the input command is forced.

<SPI Command Filtering Operation>

Figure 6:
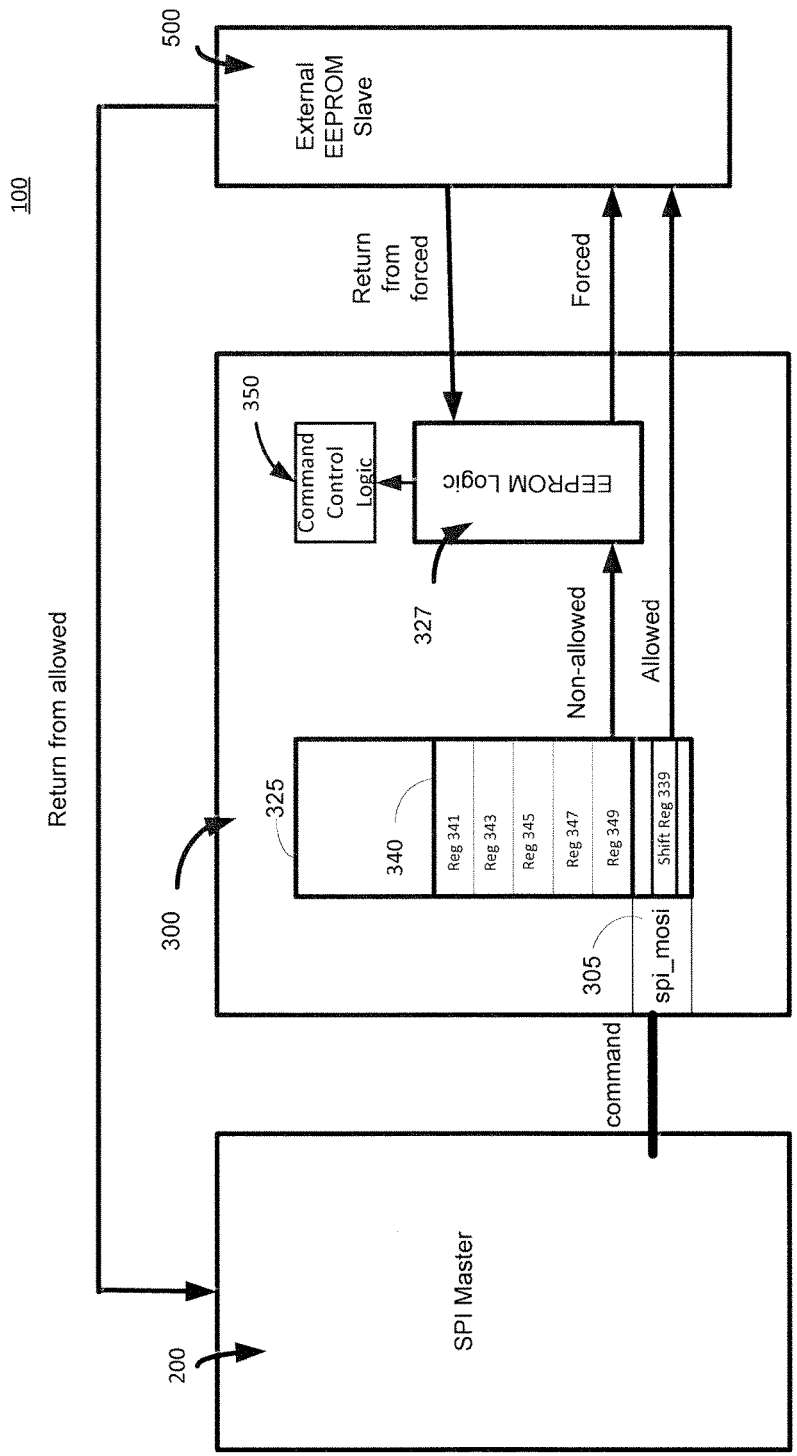
FIG. 6 is a block diagram for operation of command filtering.

If a programmable rule table that has been programmed with rules, the security device may perform command filtering. FIG. 6 is a block diagram showing the operation of command filtering. The Security Device 300 may work with an SPI master 200 to perform command pass through. In pass through, commands received on the input wire spi_mosi 305 may be directly forwarded, without cycle delay, to the External EEPROM Slave 500, as allowed commands.

As the command bits are fed into the Security Device 300, they may be compared in EEPROM firmware 325 to command bit patterns stored in the MATCH fields 453 of a programmable rule storage 340 that stores a programmable rule table. The programmable rule storage 340 may be a set of registers 341, 343, 345, 347, 349 for each rule. Each rule may delineate what action to take on command matches. In an example embodiment, there may be 16 registers for corresponding 16 rules. However, it is understood that the number of registers can be any number, based on the number of rules that potentially can be programmed, and is only limited by the storage capacity of memory allocated to the security device 300.

The External EEPROM Firmware 325 may filter SPI commands by matching N bits of an input command with a command prefix, such as command bits 653 in FIG. 5. As soon as there is a complete match of a command prefix, a rule action associated with the matching command bits may be performed. In an example embodiment, as the SPI commands are received MSB first, the External EEPROM firmware 325 maintains a shift register 339 that shifts in command bits from the LSB. The command matching operation may be performed based on the shifting maintained in this shift register 339.

A rule that indicates FORCE in the BEHAV field 459, may modify the SPI command into a known-benign command. The modifying process may convert the SPI command to a value of a rule action specified in the rule storage 350 in the FORCE_VAL field 455, for example, modifying an input command into a command as in Filter Action 655 in FIG. 5. A rule that indicates ALLOW in the BEHAV field 459 may pass any remaining bits of the command without a conversion operation.

The EEPROM logic firmware 327 may decode forced commands. Some forced commands may be forced to a read command having a dummy address in the External EEPROM 500. Also, some commands may depend on whether the External EEPROM 500 supports dual commands. The setting for dual mode or single mode is controlled by the EEPROM Logic 327.

For commands that are decoded as forced commands, a conversion operation may be performed by the EEPROM Logic 327 which converts commands into READ-like commands and the original commands may not be allowed. A dummy READ address of size 1, 2, 3, or 4 bytes as appropriate may be stored in a firmware-writable register allocated to the External EEPROM firmware 325. The forced command may be converted by adding the dummy address. In the case of single mode EEPROM, the address for the forced READ-like command may be output on a single address line. In the case of dual mode EEPROM, READ I/O may output the address on two lines. An example embodiment may work in quad mode with the READ I/O inputting and outputting on two lines.

When the filter action, such as filter action 655 in FIG. 5, does not modify the command, the address may not be converted. However, the address bits of unmodified commands may still be subject to a censoring operation. A censoring operation may force a configurable bit N (an undesired bit) of the address to a specified value (desired value). For example, the censoring operation may force all top X number of bits to a preferred value. This censoring operation may be performed without a delay of, for example, an SPI clock cycle to receive one bit.

For commands that are modified to READ-like commands, data that is returned from the External EEPROM 500 may be returned back to the security device 300, but may not be output on an MISO wire. The return may be performed such that the security device 300 drives exactly one byte-time worth of read cycles to the External EEPROM 500.

In addition to the conversion operation for forced commands, the forced commands may be supplied to the EEPROM Logic firmware 327 for security processing. The security processing may involve reversing any side effects an innocuous command may have created or take other appropriate action.

<Command Collision>

During communication with the External EEPROM 500, both the firmware for command filtering and the firmware for pass through may make use of the SPI master interface. In such case, there is a potential for collision of SPI commands as the firmware has no control over when external commands are issued. If the firmware were to require the use of the SPI master bus during a command that does not assert BUSY, the SPI microcontroller would not be able to handle that case and the overall protocol would break if an incoming command collides at the same time.

As the SPI EEPROM protocol itself has no push-back mechanism, command collision may not be handled by the security device 300 directly. Instead, the security device 300 may rely on the following:

During pass through operation, the EEPROM Logic firmware 327 issued commands to the External EEPROM slave 600 may be issued while the SPI Master 200 indicates the BUSY state.

Once the external master 200 issues a command that brings the security device 300 to BUSY state, it continuously polls for the deassertion of BUSY before proceeding with additional commands.

Thus, the SPI master access between firmware and an external master may be indirectly arbitrated with the use of BUSY. FIG. 7 is a table showing an example of the arbitration process. FIG. 7 shows 7 time steps 751. At each step in the arbitration process, Firmware 753, Controller 755 and External Master 757 perform actions as shown in FIG. 7. In terms of hardware, the BUSY command is sent to the SPI master interface. The master SPI interface has control over the interface only when BUSY is deasserted.

<Sample Rules>

Example rules for an embodiment are shown in FIG. 8. Column 801 in FIG. 8 is the n-bit command prefix. Column 803 is the indication of action type (FORCE/ALLOW). Column 805 is the command to which incoming command may be converted.

<Flowchart>

Figure 9:
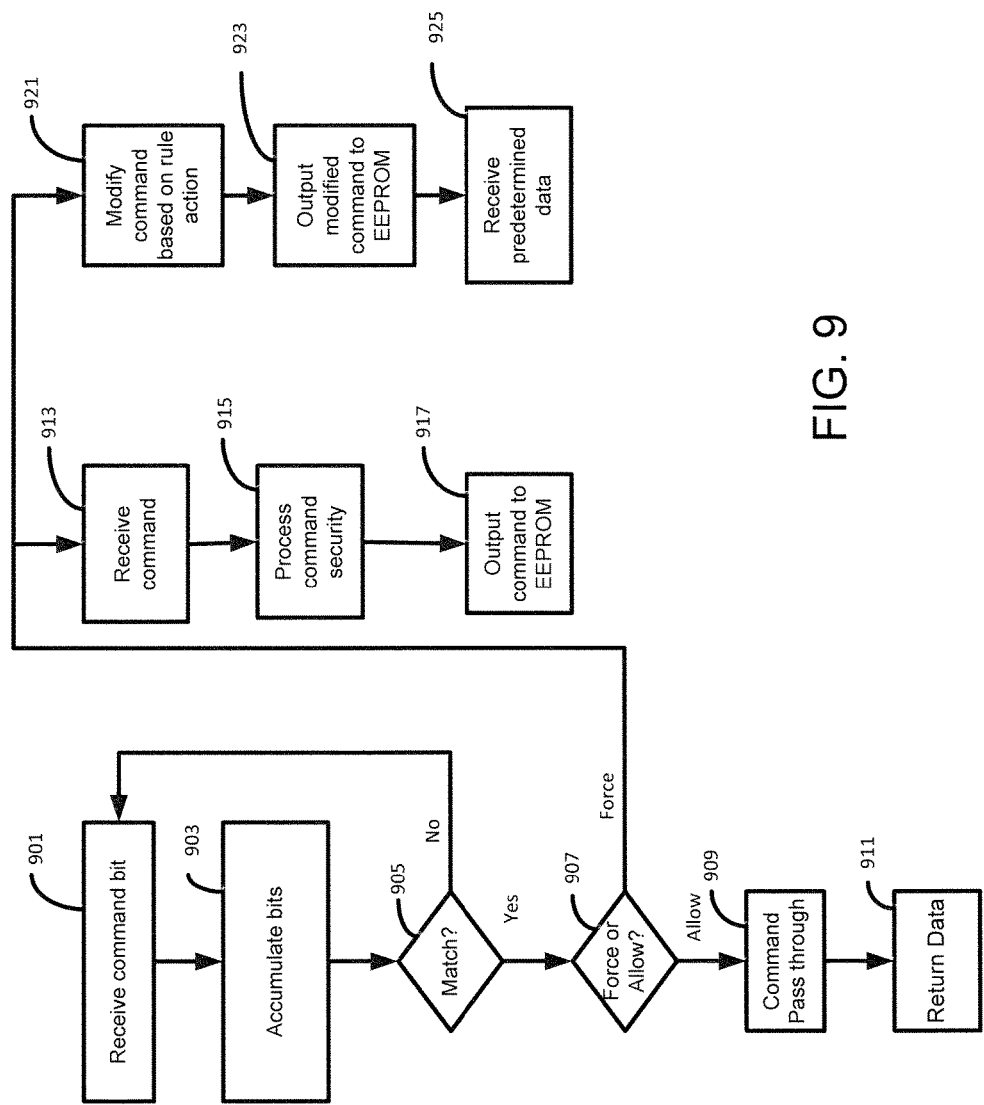
FIG. 9 is a flowchart for command filtering.

A flowchart for the operation of command filtering is shown in FIG. 9. In the case of potentially destructive commands that are to be handled by security processing before being allowed to go to the External EEPROM 500, the security processing may be performed in parallel with forcing the command to a non-destructive read-like command.

As shown in FIG. 9, as command bits arrive in the security device 300 (step 901), they may be accumulated (step 903) until a match is determined (step 905) between the input command bits and a command prefix in a rule register 340. Upon match (YES), the BEHAV field 459 may be read in the matching rule register to determine if the rule is Force or Allow (step 907). Allowed commands may be allowed to pass through the security device 300 without delay. At step 909, the remaining bits of the allowed command may be passed through to the External EEPROM 500, and at step 911, the response data is returned from the External EEPROM 500 to the SPI Master 200. As the bits are received, they may be also sent out. There may be no buffering in this process.

In the case that the BEHAV field 459 indicates that the rule is Force (step 907), at step 913, the command may be forwarded to be received by the EEPROM Logic 327. At step 915, the received command may undergo security processing before, at step 917, being output to the External EEPROM.

In parallel with security processing of the command determined as Force, the command may be forced, in accordance with a value from the FORCE_VAL field 455 in the matching register, in step 921 to a modified command. In an embodiment, the modified command is a read-like command for a dummy address. The read-like command may satisfy the timing requirements of an SPI read command such that the SPI Master 200 is unaware of any interruption due to added security processing. At step 923, the security device may output the forced command to the External EEPROM 500. Because the address associated with the forced command is a predefined dummy address, the data obtained as a response to the forced command is returned, at step 925, to be received only by the security device 300. This predefined response to the forced command is not returned to the SPI Master 200.

<Secure Memory System>

As shown in FIG. 2, an aspect of an SPI slave device 100 is a capability of directing input commands to alternative memory components. Generally in an SPI communication system, control signals are issued by an SPI Master and data may be received by the SPI Master. Control signals may be applied to the MOST line and data signals may be applied to the MISO line. Data may come in from the master or go to the master depending on which command is being executed and whether an example EEPROM is in single or dual mode. In addition, the SPI Master generates a serial clock signal to control timing of communication between the SPI Master and a SPI Slave device.

Figure 10:
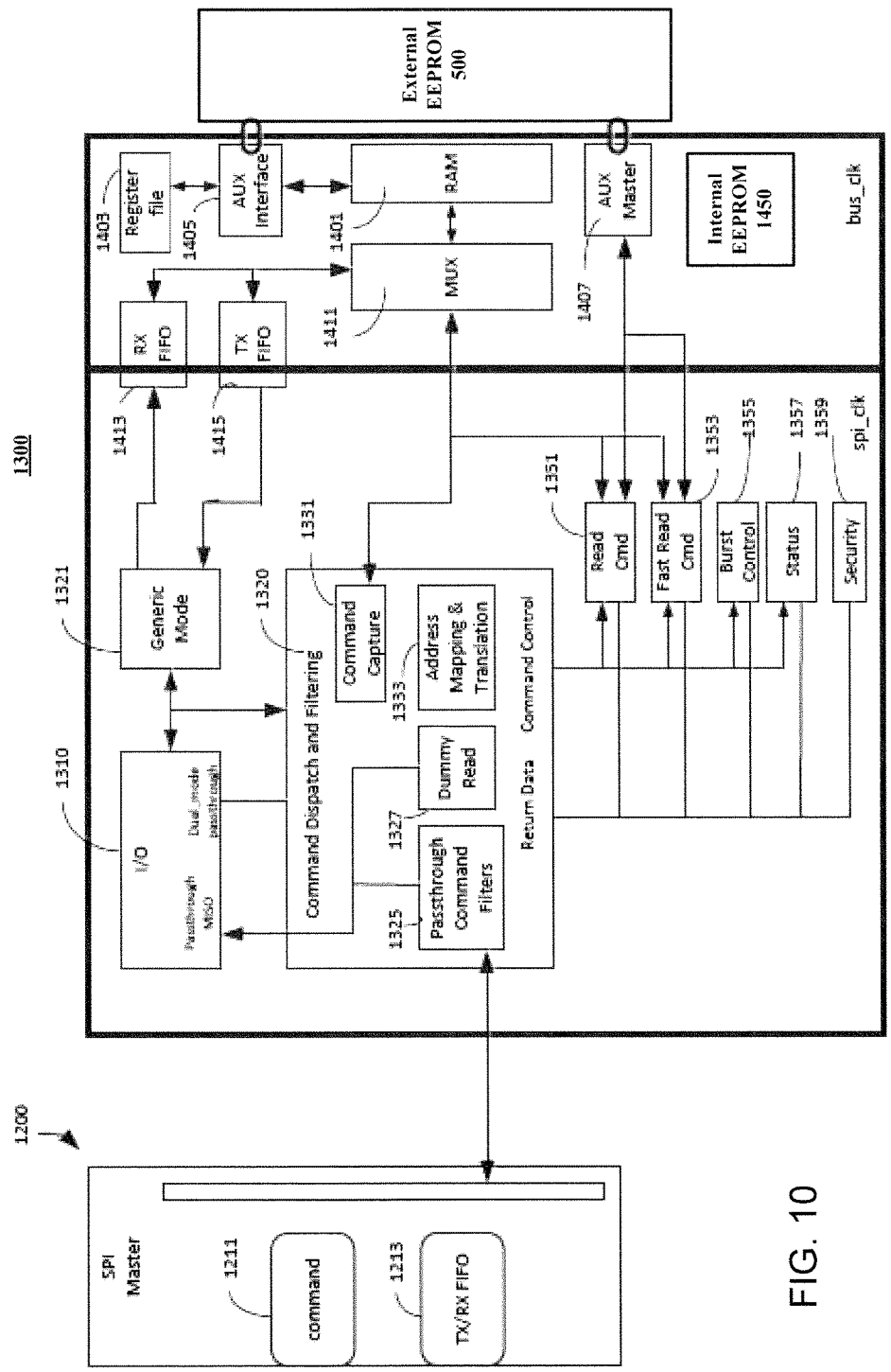
FIG. 10 is a system block diagram.

FIG. 10 shows another embodiment of the SPI EEPROM. The SPI EEPROM memory system shown in FIG. 10 is intended to replace a standard SPI EEPROM. An approach to configuring the SPI EEPROM of FIG. 10 may be to use a conventional SPI Master to control communication with a SPI Slave device 1300 that has been enhanced with security functions in firmware. As an alternative, a SPI Slave device 1300 may include functions to operate as a proxy device for an External Slave device such as external EEPROM 500.

The example embodiment shown in FIG. 10 provides both of an EEPROM mode and an EEPROM proxy mode in a single device. Alternative modes are enabled by way of command dispatch and filtering functions 1320. In addition, the single device is capable of optional control in dual mode. In dual mode, signals can be provided to the intermediate slave device using both the MISO and the MOSI lines.

The example embodiment in FIG. 10 includes SPI Master device 1200 and SPI Slave device 1300. The SPI Master device 1200 includes functions for issuing commands 1211, and TX/RX FIFO's 1213 for buffering output/input data. The SPI Master device 1200 may also be configured in the manner described above in relation to SPI Master device 200.

In the example embodiment, an SPI slave device 1300 may provide operations for an EEPROM (internal EEPROM 1450 and/or External EEPROM 500 in proxy mode). Core functions for the internal EEPROM 1450, referred to as an Internal EEPROM mode, are provided in Internal EEPROM Slave device 1300. Functions added as firmware may be provided in the SPI slave device 1300. Components within an SPI clock domain (left side of FIG. 7 to the left of the solid vertical line) operate under the SPI clock issued by the SPI Master 1200. The remainder of the components of the Internal EEPROM Slave device 1300 operate under a separate bus clock.

The Internal EEPROM Slave device 1400 includes an AUX Master port 1407, such as a GBX Master port, for access to the internal EEPROM 1450 and the external EEPROM 500. The internal EEPROM 1450 may be a Flash memory device and may be provided on the same chip as the other components of the SPI Slave device 1400. The external EEPROM 500 is a conventional EEPROM that may function as a slave in the proxy mode under control of SPI Master 1200. An external controller (e.g. for the external EEPROM 500) may be accessed by way of an AUX interface 1405, such as an AHB interface. The AUX interface 1405 can access the Register file 1403 and a local RAM 1401 as well as the external EEPROM 500. The Register file 1403 is a configuration file for the on-chip EEPROM and may also include a configuration file for the external EEPROM 500.

Data received or output in the EEPROM Slave device 1300 is performed using an RX FIFO 1413, for receiving data, and a TX FIFO 1415, for outputting data. The RX FIFO stores data that it receives into the local RAM 1401, while the TX FIFO obtains data from the local RAM 1401.

Commands being uploaded and data transfer with the TX FIFO 1415 or RX FIFO 1413 may be regulated by MUX 1411.

In order to meet timing requirements of SPI EEPROM, the External EEPROM mode 325 can examine the incoming bitstream and either force certain commands into known-safe states, or allow non-destructive commands to travel through the security device 1300 unmodified. Non-destructive commands are a predetermined set of commands that can be allowed to pass through once a sufficient number of first bits identify the command. Otherwise, the certain commands undergo a command censoring process.

The command dispatch and filtering functions 1320 may include functions for passthrough command filters 1325, which may filter commands issued to the External EEPROM 500 based on programmable rules. As the SPI protocol does not allow commands to be buffered, these commands can be inspected on the fly by the dispatcher 1320 and forwarded to the External EEPROM 500. The command dispatch and filtering functions 1320 may include functions for censoring commands into a dummy read-like command 1327.

The command dispatch and filtering functions 1320 may include Address Mapping and Translation functions 1333. During EEPROM operations, the Address Mapping and Translation functions 1333 map external commands into any of 4 memory components based on address. The memory components may include on-chip RAM 1401, internal EEPROM 1450, External EEPROM 500, and on-chip registers or flip flops.

The command dispatch and filtering functions 1320 may include a command capture function 1331 that may decode commands and external virtual addresses so that the right component is activated for access.

Once the correct components are activated, the command dispatch and filtering functions 1320 may determine the correct return data content and inform the IO module 1310 in what format the data should be streamed to the originating master (normal, dual mode or passthrough).

The IO module 1310 may be an always on component and may be configured to accept external commands during low power and active states. The IO module 1310 can be configured to sample on either positive or negative edge, MSB first or LSB first.

In addition, there may be additional inputs for dual mode and passthrough. Dual mode indicates that for a particular transaction, both MOSI and MISO should be used to output return data, while passthrough indicates the return data can be directly output without security processing. Dual mode and passthrough are not static inputs, but change depending on the type of command that is received from external masters.

IO 1310 operates on the SPI clock and is asynchronous to the on-chip core, EEPROM Slave device 1300, which operates on a bus clock.

The SPI slave device 1300 may directly accesses on-chip memory to satisfy read commands. In order to meet the timing requirements of a SPI normal read command, the command dispatch and filtering functions 1320 can perform a bit rotation operation to gather early bits before making direct memory access.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The security device handles SPI read commands, fast read commands, write commands, status inquiries, and security identification. Read and fast read commands, depending on which address component is mapped, are handled differently. Read commands are performed using a Read Command Module 1351. Read commands to the Internal EEPROM 1450 utilize the memory rotation scheme. Read commands to RAM 1401 can be further subdivided into regions. Read commands intended for the External EEPROM 500 are not affected by the read module.

The fast read command module 1353 may behave the same between on-chip RAM 1401 and Internal EEPROM 1450. The fast read command module 1353 can be separately controlled from read command module 1351 in order to meet different timing states as required by the SPI protocol. In addition, the fast read command module 1353 also may form the basis of other variations of reads such as burst read, index read, and page read.

A burst write control module 1355 can control write commands, a status module 1357 can report status information, and a security identification module 1359 may identify security of a command.

Figure 11:
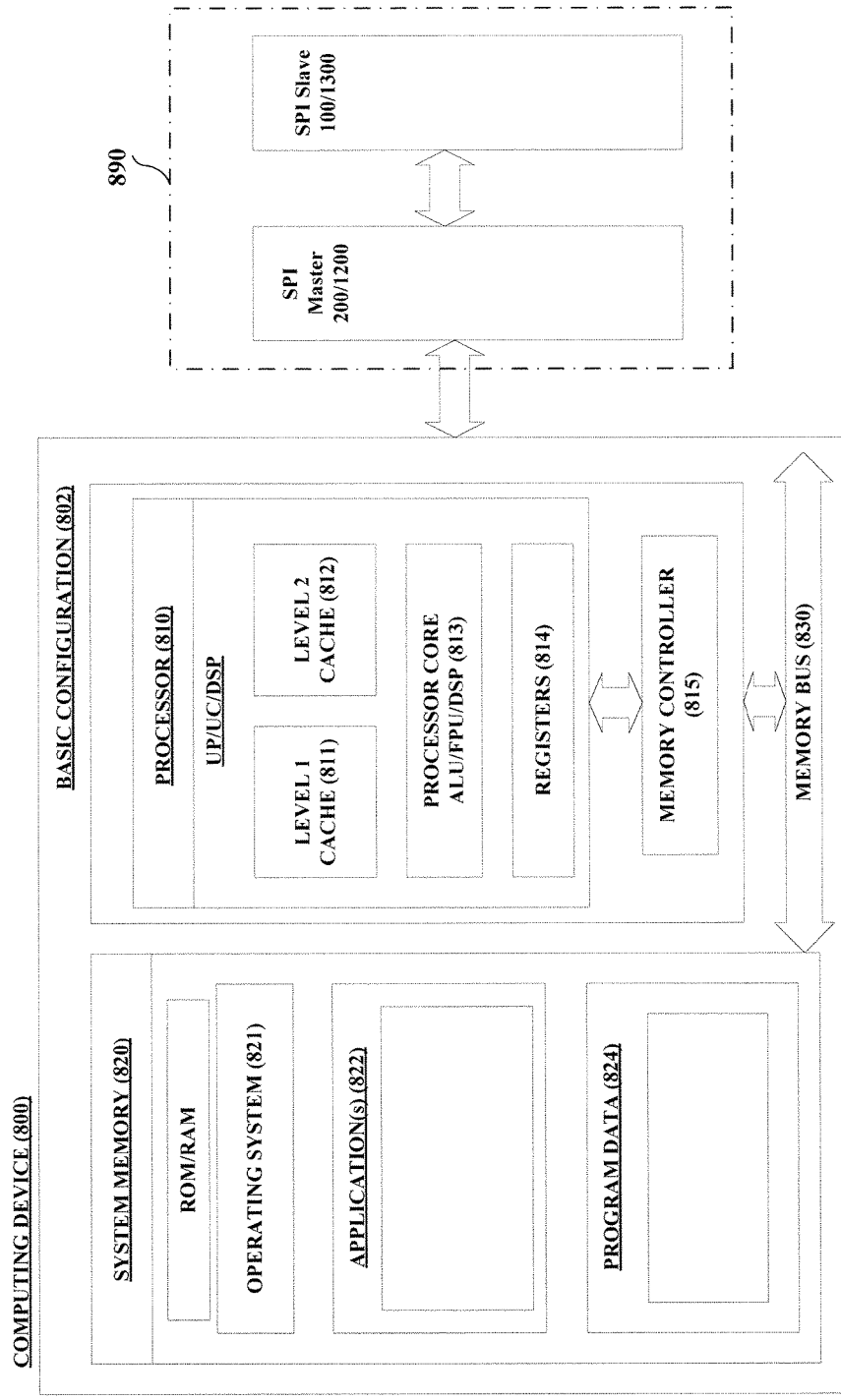
FIG. 11 is a block diagram of a computer with an SPI EEPROM system The figures depict embodiments disclosed for purposes of illustration only. One skilled in the art will recognize from the following discussion that alternative embodiments of the structures and methods illustrated herein may be employed without departing from the principles described herein.

FIG. 11 is a high-level block diagram of a conventional computer (800) the operation of which may be improved by the addition of SPI EEPROM 890. It is to be understood that SPI EEPROM 890 does not need to connect to a computer such as computer 800 and may work with other devices/chips such as hard drive controllers, SSD controllers, NICs, etc. The SPI EEPROM 890 may include an SPI master 200 and a SPI EEPROM Slave 100 as described in relation to FIG. 2 or SPI master 1200 and the SPI EEPROM slave 1300 as described in relation to FIG. 7.

In a very basic configuration (801), the computing device (800) typically includes one or more processors (810) and system memory (820). A memory bus (830) can be used for communicating between the processor (810) and the system memory (820).

The SPI EEPROM 890 may be connected to the computing device 800 via an SPI interface. It is to be understood, however, that one of ordinary skill in the art may adapt the SPI EEPROM to connect to computer 800 in various different conventional ways such as direct memory access and USB (Universal Serial Bus). In an alternative, the SPI EEPROM 890 may itself be incorporated into the computing device 800. The dashed lines around the SPI EEPROM 890 indicate optional separate packaging but it is to be understood the SPI EEPROM 890 may be constructed as one or more chips that may be part of the motherboard of computing device 800. All other conventional and to be developed connection and/or integration techniques may be utilized to combine the functionality of the computing device and the SPI EEPROM 890.

Moreover, the SPI EEPROM 890 enables filtering of SPI commands performing operations in an EEPROM while allowing a secure SPI device to include large off-chip storage. Furthermore, combining the SPI EEPROM 890 with a conventional computing device 800 greatly improves the underlying functionality of the combined devices. As such the SPI EEPROM 890 provides a technical solution with distinct technical advantages whether or not it is a stand-alone device or used in combination with a computer 800, hard drive controller, SSD controller, NIC, etc.

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (815) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more application(s) (822), and program data (824). The application (822) may include programs that request data from an SPI EEPROM 890. Program Data (824) may include storing instructions that requests data from an SPI EEPROM 890.

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method in a memory system having a security device and an electrically erasable programmable read only memory (EEPROM), comprising:
   accepting N bits of a command and matching the N bits to a command filtering rule;
   based on the matching of the N bits of the command to the command filtering rule, selectively performing a filter action associated with the matched command filtering rule:
   responsive to the N bits matching the command filtering rule of a destructive command, the destructive command capable of a result that modifies data in the EEPROM:
      performing the filter action to convert the destructive command to a non-destructive command, the non-destructive command incapable of a result that modifies data in the EEPROM;
      outputting the converted command to the EEPROM; and
      receiving, from the EEPROM, read data corresponding to the converted command; or
   responsive to the N bits matching the command filtering rule of a non-destructive command, allowing the non-destructive command to pass through to the EEPROM unchanged.

2. The method of claim 1, wherein:
   the N bits of the command comprise a command prefix;
   the command filtering rule includes a command prefix pattern, a filter function, and a filter action; and
   the method further comprises, responsive to the command prefix matching the command prefix pattern, performing the filter function included in the command filtering rule containing the command prefix pattern.

3. The method of claim 1, further comprising:
   responsive to the N bits of the command matching the command filtering rule of the destructive command, authenticating, by the security device, the destructive command at least partially in parallel with performance of the filter action to convert the destructive command.

4. The method of claim 1, wherein the non-destructive command that results from the conversion of the destructive command comprises a Read-like command for returning predefined dummy data.

5. A memory system, comprising:
an electrically erasable programmable read only memory (EEPROM) including a command input pin; and
a security device connected to the command input pin of the EEPROM, the security device configured to:
    capture commands being sent to the EEPROM and match the commands to a command filtering rule of a destructive command, which modifies data in the EEPROM, or to another command filtering rule of a non-destructive command, which does not modify data in the EEPROM;
    for a command that matches the command filtering rule of a destructive command, convert the command to a converted command that is not destructive;
    transmit the converted command to the EEPROM; and
    receive read data from the EEPROM responsive to the converted command; and
    for a command that matches the other command filtering rule of a non-destructive command, allow the command to pass through unmodified to the EEPROM.

6. The memory system of claim 5, further comprising:
a master device that is configured to manage destructive commands and non-destructive commands, wherein the EEPROM is configured to return data based on the destructive commands and the non-destructive commands.

7. The memory system of claim 5, wherein:
the security device includes a programmable rule storage device configured to store a programmable rule set including multiple command filtering rules, at least one command filtering rule of the multiple command filtering rules including a command prefix and associated with a conversion action; and
the security device is configured to:
    detect whether a command received from a master device comprises a destructive command or a non-destructive command by matching the received command to a command prefix of a command filtering rule; and
    determine an associated conversion action if the matched command prefix corresponds to a destructive command.

8. The memory system of claim 7, wherein:
the programmable rule storage device comprises a plurality of registers for each respective command filtering rule; and
each command filtering rule is configured to indicate the conversion action based on a matched command prefix.

9. The memory system of claim 8, wherein:
the conversion action is indicative of a non-destructive command to which the destructive command is to be converted; and
the EEPROM is configured to return a predefined data output to the security device responsive to receipt of the non-destructive command resulting from the conversion action.

10. The memory system of claim 7, wherein the security device is configured to:
serially receive the command from the master device as command bits; and
perform the associated conversion action responsive to a complete match of a command prefix to the command bits.

11. The memory system of claim 7, wherein the security device is configured to:
receive command bits with a most-significant bit (MSB) first;
maintain a shift register that shifts in the command bits from a least-significant bit (LSB); and
match the command bits to a command prefix of at least one command filtering rule as the command bits are shifted in the shift register.

12. The method of claim 1, wherein the N bits of the command comprise at least a portion of a total quantity of command bits for a given command of the memory system.

13. The method of claim 1, wherein the outputting comprises outputting the converted command to the EEPROM prior to completion of a command authentication security process performed by the security device.

14. The method of claim 1, wherein the allowing comprises allowing the non-destructive command to pass through to the EEPROM unchanged without performing the filter action.

15. The method of claim 1, wherein the allowing comprises allowing the non-destructive command to pass through to the EEPROM unchanged without performing a command authentication security process by the security device.

16. The memory system of claim 7, wherein each command prefix of each command filtering rule comprises at least portion of a total quantity of command bits for a given command of the memory system.

17. The memory system of claim 7, wherein:
each command filtering rule of the multiple command filtering rules includes a filter function;
at least a portion of the multiple command filtering rules includes a filter action; and
the associated conversion action of a given command filtering rule corresponds to at least one of the filter function or the filter action of the given command filtering rule.

18. The memory system of claim 5, wherein the security device is configured to perform security processing on the command that matches the command filtering rule of a destructive command at least partially in parallel with the conversion of the command to the converted command that is not destructive.

19. The memory system of claim 5, wherein the destructive command comprises at least one of a write command, a mode-changing command, or an erase command.

20. An apparatus comprising:
a rule storage configured to store multiple command filtering rules, each command filtering rule including a match field and a filter behavior field, the filter behavior field configured to have a force value or an allow value, the force value corresponding to a destructive command that modifies an electrically erasable programmable read only memory (EEPROM), and the allow value corresponding to a non-destructive command that does not modify the EEPROM; and
EEPROM logic coupled to the rule storage, the EEPROM logic configured to:

match a received command to a particular command filtering rule of the multiple command filtering rules using the match field of the particular command filtering rule;

determine if the filter behavior field of the particular command filtering rule has the force value or the allow value; and responsive to the filter behavior field of the particular command filtering rule having the force value,
- convert the received command to a converted command that does not modify the EEPROM;
- transmit the converted command to the EEPROM; and
- receive, from the EEPROM, read data corresponding to the converted command, or responsive to the filter behavior field of the particular command filtering rule having the allow value, pass the received command unmodified to the EEPROM.

* * * * *